United States Patent [19]

Bean

[11] Patent Number: 4,648,694
[45] Date of Patent: Mar. 10, 1987

[54] BICYCLE WHEEL SAFETY ATTACHMENT

[76] Inventor: Edward Bean, 416 Powder Mill Rd., Nashville, Tenn. 37205

[21] Appl. No.: 747,257

[22] Filed: Jun. 21, 1985

[51] Int. Cl.$^4$ .............................................. G02B 5/12
[52] U.S. Cl. ...................................................... 350/99
[58] Field of Search ............... 350/97, 99; 301/37 SA, 301/37 R

[56] References Cited

U.S. PATENT DOCUMENTS

| | | | |
|---|---|---|---|
| 3,901,554 | 8/1975 | Kennedy et al. | 350/99 |
| 3,951,517 | 4/1976 | Levy et al. | 350/99 |
| 4,037,924 | 7/1977 | May | 350/99 |
| 4,140,368 | 2/1979 | Sundahl | 350/97 |
| 4,470,663 | 9/1984 | Tresch et al. | 350/99 |

Primary Examiner—John K. Corbin
Assistant Examiner—Loha Ben
Attorney, Agent, or Firm—Pitts and Brittian

[57] ABSTRACT

A safety attachment (10) for being releasably mounted on the spoked wheel (16) of a vehicle such as a bicycle for enhancing the visibility of the vehicle and/or decorating the vehicle is disclosed. The attachment (10) comprises a display panel (12) for being releasably mounted between the spokes (14) radiating from the opposite end portions of the hub (32) of the wheel (16), the display panel (12) defining oppositely disposed display surfaces (18, 20). The panel (12) further defines an outer edge portion (22) which is positioned proximate the rim (24) of the wheel (16) between the converging spokes (14), and an inner portion (26) positioned proximate the hub (32) of the wheel (16). The attachment (10) further comprises spring biased fastening means (28) for releasably securing said display panel (12) in position between the spokes (14).

12 Claims, 3 Drawing Figures

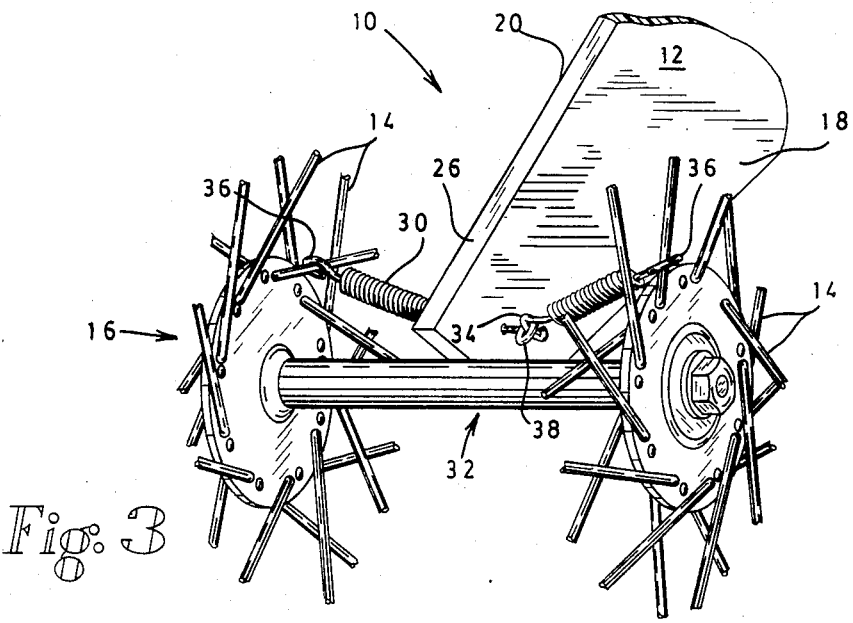
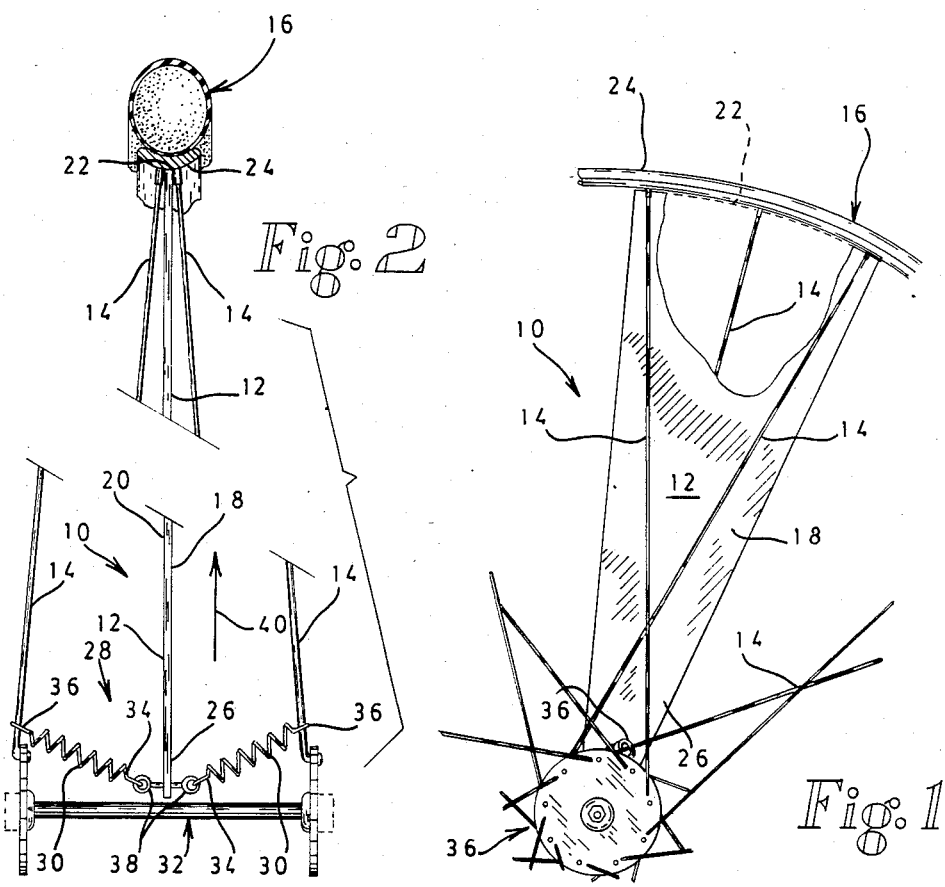

BICYCLE WHEEL SAFETY ATTACHMENT

DESCRIPTION

1. Technical Field

This invention relates to a safety attachment for being releasably mounted on the spoked wheel of a vehicle such as a bicycle for enhancing the visibility of such vehicle and/or to decorate such vehicle. The invention generally comprises a display panel and spring biased fastening means for releasably securing the display panel to the wheel.

2. Background Art

Reflectors and display devices for attaching to bicycle wheels to make bicycles more visible to operators of other vehicles have long been known in the art. However, such devices generally incorporate complex fastening means for mounting the devices to the bicycle wheel, such means often comprising numerous parts which may break or become lost. Moreover, children often have difficulty mounting such devices because of this complexity and because mounting of such devices normally requires tools which are not readily available to a child. Some attempts have been made to devise reflectors or display attachments which are easy to mount and can be mounted without special tools, but such devices have done little to reduce the complexity and, thus, the expense of manufacture, of such devices. Further, U.S. Pat. No. 3,901,554 discloses a bracket assembly which is easy to mount and requires no special tools. However, this bracket assembly comprises a pin which locks in a snap type fit in a cap, but this mechanism still can be difficult for a child to manipulate.

Therefore, it is an object of the present invention to provide a safety attachment for being releasably received on the spoked wheel of a vehicle for enhancing the visibility of such vehicle to operators of other vehicles.

It is another object of the present invention to provide a safety attachment which requires no tools in order to mount the attachment on a wheel.

Still a further object of the present invention is to provide a safety attachment which is easy to mount on a wheel such that a child can effect such mounting.

Yet another object of the present invention is to provide a safety attachment which is inexpensive to manufacture and maintain.

DISCLOSURE OF THE INVENTION

Other objects and advantages will be accomplished by the present invention which provides a safety attachment for being releasably mounted on a spoked wheel of a vehicle such as a bicycle for enhancing the visibility of the vehicle and/or decorating the vehicle. The safety attachment of the present invention comprises a display panel for being releasably mounted between the spokes radiating from the opposite end portions of the hub of the wheel. The display panel defines oppositely disposed first and second display surfaces, and further defines an outer edge portion and an inner portion. The safety attachment also comprises spring biased fastening means for releasably securing the display panel in position between said spokes. In one preferred embodiment such fastening means comprises a pair of oppositely disposed spring members, each defining first end portions secured to the inner portion of the display panel and second end portions for releasably engaging the spokes of the wheel. Accordingly, in the preferred embodiment the spring members secure the inner portion of the display panel to the spokes proximate the opposite ends of the wheel hub and bias the display panel toward the rim proximate the point where the spokes converge to engage the rim of the wheel.

BRIEF DESCRIPTION OF THE DRAWINGS

The above mentioned features of the invention will become more clearly understood from the following detailed description of the invention read together with the drawings in which:

FIG. 1 illustrates a side elevation view of the safety attachment of the present invention as it is mounted on a wheel.

FIG. 2 is a partial end view, partially in section, of the safety attachment of the present invention mounted on a wheel.

FIG. 3 is a perspective view of the inner portion of the display panel and spring biased fastening means of the safety attachment of the present invention.

BEST MODE FOR CARRYING OUT THE INVENTION

A bicycle wheel safety attachment incorporating various features of the present invention is illustrated generally at 10 in the Figures. As will become apparent from the discussion which follows the attachment 10 of the present invention is designed to be releasably mounted on the wheel of a bicycle, tricycle or other vehicle having a spoked wheel. Thus, whereas the invention will at times be discussed in terms of mounting the attachment 10 on a bicycle wheel, it will be appreciated that the attachment can be utilized with other vehicles provided with wheels comprising spokes.

Referring now to the Figures, the attachment 10 comprises a display panel 12 for being releasably mounted between the spokes 14 of the wheel 16. The panel 12 defines oppositely disposed display surfaces 18 and 20 and an outer edge portion 22. In the preferred embodiment illustrated in the figures the display panel 12 defines a wedge-shape configuration with the outer edge portion 22 defining an arc of substantially equal radius to the arc defined by the interior of the rim 24 of the wheel 16. This wedge-shape configuration facilitates the adjacent mounting of a plurality of attachments 10 on a single wheel and the wide arcuate outer edge portion 22 serves to conform to the arc defined by the rim 24 to facilitate the stable mounting of the attachment 10. However, it will be appreciated that the display panel 12 can be fabricated to define various other geometric configurations and the illustrated embodiment is simply one preferred embodiment of the display panel 12.

The display panel 12 further defines an inner portion 26 provided with spring biased fastening means 28 for releasably securing the attachment 10 to the wheel 16 proximate the hub 32. In the preferred embodiment of the figures the fastening means 28 comprises a pair of spring members 30 each defining opposite hooked end portions 34 and 36. Further, the inner portion 26 of the panel 12 is provided with oppositely disposed fastening eyes 38 for releasably receiving the hooked end portions 34 of the spring members 30. Of course, if desired the spring members 30 can be permanently secured to the inner portion 26. However, by constructing the attachment 10 such that the spring members 30 are releasably secured to the panel 12, a broken spring member 30 can be replaced without having to totally replace the attachment 10.

With respect to the mounting of the attachment 10 on the wheel 16, it will first be noted that the spokes 14 radiate from the opposite ends of the hub 32 and converge at the rim 24 of the wheel 16 to engage the rim 24 at preselected intervals. Thus, as illustrated in FIG. 2, in mounting the attachment 10 the display panel 12 is positioned between the spokes 14 which radiate from the opposite end portions of the hub 32 with the outer edge portion 22 of the panel 12 being received between the spokes 14 proximate the rim 24 such that the spokes 14, alternately converging on the rim 24, serve to hold the outer edge portion of the display panel in place. The inner portion 26 of the display panel 12 is then releasably secured to the wheel proximate the hub 32 by securing the hooked end portions 36 of the spring members 30 to spokes 14 proximate the opposite ends of the hub 32 such that the lower portion 26 of the panel 12 is suspended between the oppositely disposed spokes 14. Further, in the preferred embodiment the length of the panel 12 and the positioning of the fastening eyes 38 is such that the fastening eyes 38 are positioned closer to the axis of the hub 32 than the point and which the oppositely disposed spring members 30 engage the spokes 14 proximate the opposite end portions of the hub 32. This results in the outward spring biasing of the panel 12 in the direction of the arrow 40 such that the outer edge portion 22 of the panel 12 is forced toward the rim 24, insuring the stable positioning of the panel 12 between the spokes 14.

Of course, it will be recognized by those skilled in the art that the display panel 12 with its oppositely disposed display surfaces 18 and 20 serves not only a decorative function, but serves to make the vehicle on which the attachment 10 is mounted more noticeable to operators of other vehicles. In this regard, the panel 12 is preferably brightly colored, or coated with or fabricated of a light reflective material, so as to be more noticeable to operators of other vehicles at night. Further, whereas a plurality of attachments 10 can be mounted on a single wheel, a single attachment rotating about the hub of a wheel produces an eye catching visual effect which makes a vehicle much more visible in traffic.

From the discussion above it will be appreciated that the vehicle safety attachment 10 of the present invention serves to enhance the safe operation of the vehicle by making the vehicle more noticeable to operators of other vehicles. Further, the spring biased fastening means of the attachment 10 allows the attachment to be quickly mounted, repositioned or removed from a wheel without the need for tools. As noted above, mounting of the attachment 10 is simply a matter of positioning the display panel 12 between the spokes 14 and securing the hooked end portions of the spring members 30 to the fastening eyes 38 and the adjacent spokes 14. Thus, unlike various conventional bicycle relectors and attachments, a child can mount the attachment 10 without assistance.

While a preferred embodiment has been shown and described, it will be understood that there is no intent to limit the invention to such diclosure, but rather it is intended to cover all modifications and alternate constructions fallin9 within the spirit and scope of the invention as defined in the appended claims.

I claim:

1. A safety attachment for being releasably mounted on a wheel of a vehicle for enhancing the visibility of said vehicle, said vehicle wheel comprising a hub defining first and further opposite end portions, a rim for supporting a suitable tire, a first plurality of spokes radiating from said first opposite end portion of said hub and engaging said rim at preselected intervals, and a second plurality of spokes radiating from said further opposite end portion of said hub and engaging said rim at selected intervals, said wheel safety attachment comprising:

a display panel for being releasably mounted between said first plurality of spokes and said second plurality of spokes in a plane perpendicular to said hub, said display panel defining an outer edge portion for contact with said rim and an inner portion, said outer edge portion having a sufficient width to interleave at said rim with at least two spokes of said first plurality of spokes and at least one spoke of said second plurality of spokes; and spring biased fastening means for connection between said display panel and said spokes for releasably securing said display panel in position between said spokes and biasing said outer edge portion against said rim.

2. The safety attachment of claim 1 wherein said spring biased fastening means comprises at least one coil spring member provided with a first end portion secured to said display panel and a scond end portion for releasable engaging one of said spokes.

3. The safety attachment of claim 2 wherein said spring biased fastening means comprises a pair of said coil spring members, said coil spring members being secured at first end portions to said display panel proximate said inner portion of said panel, and wherein said second end portion of one of said coil spring members releasably engages at least one spoke of said first plurality of spokes and said second end portion of the other of said coil spring members releasably engages at least one spoke of said second plurality of spokes.

4. The safety attachment of claim 3 wherein said first end portion of each of said spring members engages said inner portion of said display panel at a seccuring point located a first preselected radial distance from the axis of said hub of said wheel, and wherein said second end portion of each of said spring members engages at least one of said spokes at a securing point located a second preselected radial distance from the axis of said hub, said second preselected radial distance being greater than said first preselected radial distance, whereby said spring members bias said outer edge portion of said display panel outwardly toward said rim of said wheel so as to secure the position of said outer edge portion against said rim.

5. The safety attachment of claim 3 wherein said inner portion of said display panel is provided with a pair of oppositely disposed fastening eyes, and said first end portions of said spring members define hooked end portions for being releasably received in said fastening eyes whereby said spring members are releasably secured to said display panel.

6. The safety device of claim 3 wherein said second end portions of said spring members define hooked end portions for releasably securing said spring members to said spokes.

7. The safety attachment of claim 4 wherein said second end portions of said spring members define hooked end portions for releasably securing said spring members to said spokes.

8. The safety attachment of claim 1 wherein said display panel defines a light reflective surface for enhancing the visibility of said vehicle at night.

9. The safety attachment of claim 1 wherein said display panel defines substantially a triangular configuration for facilitating the mounting of a plurality of said attachments on said wheel.

10. The safety attachment of claim 1 wherein said outer edge portion of said display panel defines an arcuate edge for abutting against said rim of said wheel.

11. A safety attachment for being releasably mounted on a wheel of a vehicle for enhancing the visibility of said vehicle, said vehicle wheel comprising a hub defining first and further opposite end portions, a rim for supporting a suitable tire, a first plurality of spokes radiating from said first opposite end portion of said hub and engaging said rim at preselected intervals, and a second plurality of spokes radiating from said further opposite end portion of said hub and engaging said rim at selected intervals alternating with spokes of said first plurality of spokes, said wheel safety attachment comprising:

a display panel for being releasably mounted between said first plurality of spokes and said second plurality of spokes in a plane perpendicular to said hub, said display panel defining oppositely disposed first and second display surfaces, and further defining an outer edge portion contoured to match said rim and an inner portion, said outer edge portion having a sufficient width to interleave at said rim with at least two of said first plurality of spokes andd at least one of said second plurality of spokes, said display panel further comprising first and second fastening eyes, said first fastening eye being mounted on said first display surface of said panel proximate said inner portion of said panel, and said second fastening eye being mounted on said second display surface of said panel proximate said inner portion of said panel; and spring biased fastening means for releasable securing said display panel in position between said spokes with said outer edge portion in contact with said rim, said fastening means comprising a pair of spring members, each of said spring members provided with a first hooked end portion for being received in one of said fastening eyes and a second hooked end portion for releasably engaging at least one of said spokes of said wheel.

12. A safety attachment of being releasably mounted on a wheel of a vehicle for enhancing the visibility of said vehicle, said vehicle wheel comprising a hub defining an axial portion and first and further opposite end portions of greater radius than said axial portion, a rim for supporting a suitable tire, a first plurality of spokes radiating from said first opposite end portion of said hub and engaging said rim at preselected intervals, and a second plurality of spokes radiating from said further opposite end portion of said hub and engaging said rim at selected intervals alternating with spokes at said first plurality of spokes, said wheel safety attachment comprising:

a display panel for for being releasably mounted between said first plurality of spokes and said second plurality of spokes in a plane perpendicular to said hub and extending from said rim to proximate said axial portion of said hub, said display panel defining oppositely disposed first and second display surfaces, and further defining an outer edge portion for contact with said rim and an inner portion, said outer edge portion having a sufficient width to interleave with at least two spokes of said first plurality of spokes and at least one spoke of said second plurality of spokes, said display panel further comprising first and second fastening eyes, said first fastening eye being mounted on said first display surface of said panel proximate said inner portion of said panel, and said second fastening eye being mounted on said second display surface of said panel proximate said inner portion of said panel, said first and second fastening eyes being mounted in a position at a radius less than said end portions of said hub; and spring biased fastening means for releasably securing said display panel in position between said spokes, with said outer edge portion against said rim, said fastening means comprising a pair of coil spring members, each of said coil spring members provided with a first hooked end portion for being received in one of said fastening eyes and a second hooked end portion for releasably engaging at least one of said spokes of said wheel proximate said first and further opposite end portions of said hub at a radius greater than said position of said fastening eyes whereby said coil spring members bias said display panel toward said rim with said outer edge panel abutting said rim.

* * * * *